(12) United States Patent
Doetzer

(10) Patent No.: US 10,543,651 B2
(45) Date of Patent: Jan. 28, 2020

(54) POLYMER PRESSURE VESSEL END-CAP AND LINER-LESS PRESSURE VESSEL DESIGN

(71) Applicant: Composite Cluster Singapore Pte. Ltd., Singapore (SG)

(72) Inventor: Florian Doetzer, Singapore (SG)

(73) Assignee: Composite Cluster Singapore Pte. Ltd., Singapore (SG)

( * ) Notice: Subject to any disclaimer, the term of this patent is extended or adjusted under 35 U.S.C. 154(b) by 312 days.

(21) Appl. No.: 15/484,664

(22) Filed: Apr. 11, 2017

(65) Prior Publication Data

US 2017/0299057 A1 Oct. 19, 2017

Related U.S. Application Data

(63) Continuation-in-part of application No. PCT/IB2016/052090, filed on Apr. 13, 2016, and a continuation-in-part of application No. PCT/IB2016/052091, filed on Apr. 13, 2016.

(51) Int. Cl.

| *F16J 13/12* | (2006.01) |
|---|---|
| *B29C 70/84* | (2006.01) |
| *B29C 70/32* | (2006.01) |
| *B29K 105/08* | (2006.01) |

(52) U.S. Cl.
CPC ............ *B29C 70/845* (2013.01); *B29C 70/32* (2013.01); *B29K 2105/0872* (2013.01)

(58) Field of Classification Search
CPC .... B65D 90/041; B65D 90/08; B65D 90/042; B65D 85/84; B29C 48/03; B29C 65/02; B29C 65/42; B29C 65/4815; B29C 65/562; B29C 65/72; B29C 66/1162; B29C 66/30341; B29C 66/4326; B29C 66/43421; B29C 66/43441; B29C 66/61; B29C 66/71; B29C 66/836; B29C 66/861; B29C 63/30; B29C 2063/488; B29C 65/425; B29C 65/525; B29C 48/05; B29C 48/02; E02D 17/08; B29L 2031/7126; E02B 5/02; E02B 2201/00; E02B 13/00; F17C 3/12; F17C 2203/012; F17C 2203/0604; Y10T 29/49947; Y10T 29/4997; B29K 2027/06; B29K 2023/06; B29K 2023/12; B29K 2027/16
See application file for complete search history.

(56) References Cited

U.S. PATENT DOCUMENTS

| 6,926,939 B2 | 8/2005 | Hargett, Jr. |
| 8,074,826 B2 | 12/2011 | Cronin et al. |
| 2004/0026431 A1 | 2/2004 | Jones |
| 2015/0192251 A1 | 7/2015 | Tupper et al. |

(Continued)

*Primary Examiner* — Vishal I Patel
(74) *Attorney, Agent, or Firm* — Taylor English Duma LLP

(57) ABSTRACT

An end-cap arrangement for a polymer pressure vessel comprises an end-cap, a filler element for being provided in the vicinity of the end part of the polymer pressure vessel, and a polymer outer ring. The end-cap comprises a polymer end-cap part and a polymer inner ring part being integrally connected to the polymer end cap part. The end-cap is provided for inserting into an end part of the polymer pressure vessel such that the polymer end-cap part seals the end part of the polymer pressure vessel. The polymer inner ring part and the polymer outer ring are arranged for providing radial compression of the filler element.

7 Claims, 13 Drawing Sheets

(56) References Cited

U.S. PATENT DOCUMENTS

| | | |
|---|---|---|
| 2015/0258740 A1 | 9/2015 | Kang et al. |
| 2015/0316207 A1* | 11/2015 | Laney ................. B05D 1/02 220/581 |

* cited by examiner

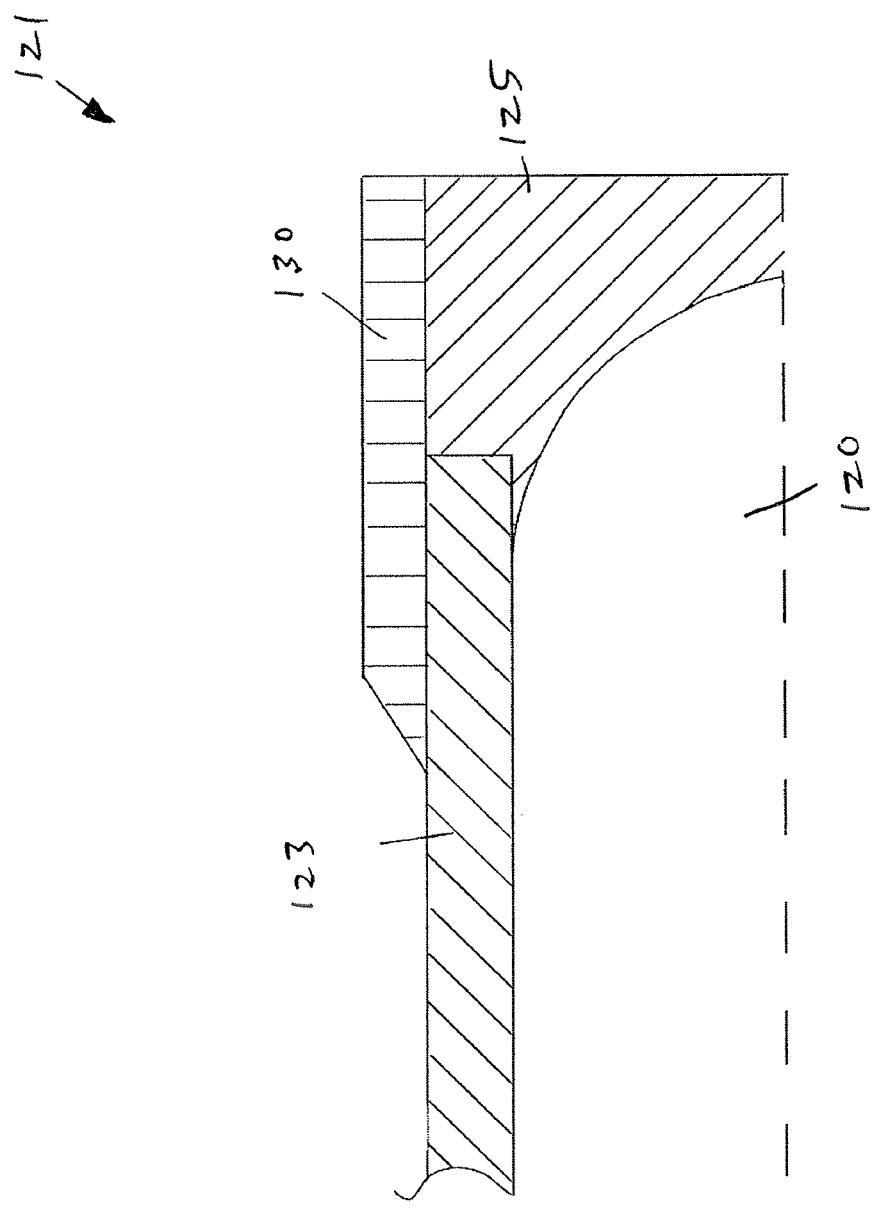

POLYMER PRESSURE VESSEL END-CAP AND LINER-LESS PRESSURE VESSEL DESIGN

CROSS-REFERENCE TO RELATED APPLICATIONS

In accord with 35 U.S.C. § 111(a), this application is a continuation-in-part of PCT International Application number PCT/IB2016/052090, filed Apr. 13, 2016, and is a continuation-in-part of PCT International Application number PCT/IB2016/052091, filed Apr. 13, 2016, the entire disclosures of which are hereby incorporated herein by this reference in their entireties.

FIELD

This application relates to an improved polymer pressure vessel end-cap and to a liner-less pressure vessel.

BACKGROUND

U.S. Pat. No. 6,926,939 B2 discloses a self-sealing vessel assembly for high pressure microwave assisted chemistry. The vessel assembly includes a polymeric cylinder and a circular polymeric cap for the cylinder, the cylinder being closed at one end and open at the other end to receive the cap.

The design of existing fiber reinforced pressure vessels includes either a metal liner (Type-III) or a polymer-based liner (Type-IV). The liner provides support for winding process during manufacturing and serves as permeation barrier for the pressure vessel during operation.

US 20150258740 A1 discloses a method and an apparatus for manufacturing a liner-less pressure vessel, which can be used for manufacturing a high-pressure tank, by spinning of continuous fiber in a centrifugal direction.

US 20150316207 A1 discloses a composite pressure vessel and method of manufacture. The composite pressure vessel comprises a multi-component mandrel that is integrated into the vessel, thereby becoming a permanent part of the pressure vessel, and comprises a cylinder and dome ends.

US 20150192251 A1 shows embodiments described herein including a composite pressure vessel that includes both high performance fibers and low performance fibers. The embodiments also include a method forming a pressure vessel with high performance fibers and low performance fibers. A plurality of the high-performance fibers may be found in an inner layer of the pressure vessel and a plurality of the low performance fibers may be found in an outer layer of the pressure vessel.

U.S. Pat. No. 8,074,826 B2 shows a liner-less tank structure having a body that defines an enclosed interior volume. The body has a cylindrical section having an axis of symmetry and a dome section coupled with the cylindrical section. The construction of the pressure vessel includes multiple fiber plies. At least one of the fiber plies is a helical ply having fibers traversing the dome helically about the axis of symmetry. At least a second of the fiber plies is a braided or woven ply.

US 20040026431 A1 shows a light weight high performance vessel, for example, a tank and a method of making same which is produced primarily from reinforced plastic composite materials. The vessel can be used for the containment of liquids or pressurized gases. The tank is comprised of an inner shell which is split to remove a mandrel on which it is formed and to install components in the inner shell. The inner shell pieces are then secured together by means of a joinder ring. An outer shell is then formed around and completely encapsulates the inner shell.

SUMMARY

It is an objective of the application to provide an improved end-cap for a pressure vessel.

The application provides an end-cap arrangement for a polymer pressure vessel. The end cap arrangement includes a polymer end-cap, a filler element, and a polymer outer ring.

The polymer end-cap comprises a polymer end-cap part and a polymer inner ring part, which is integrally connected to the polymer end cap part. In use, the polymer end-cap is inserted into an end part of the pressure vessel such that the polymer end-cap part seals the end part of the pressure vessel.

The filler element, in use, is placed in the vicinity of the end part of the pressure vessel such that the polymer inner ring part and the polymer outer ring provides radial compression of the filler element.

This arrangement provides a good and low cost sealing of the polymer pressure vessel.

In one aspect of the application, the polymer inner ring part, the polymer outer ring, and the filler element are further arranged for providing radial compression of the filler element and radial compression of the end part of the pressure vessel. This allows for a strong attachment between the end-cap and the pressure vessel.

The end part, the inner ring part, the outer ring, and the filler element are often produced by injection or compression molding process.

The filler element is often provided in a shape of a cylinder for easy production.

The polymer end cap can be attached to the polymer pressure vessel via a screw and nut mechanism.

The polymer end-cap can comprise at least one reinforcement fillet for strengthening the polymer end-cap.

The application also provides a further end-cap arrangement for a polymer pressure vessel with a polymer liner. The end cap arrangement includes a polymer end-cap. The polymer end-cap includes a polymer end-cap part and a polymer inner ring part, which is integrally connected to the polymer end cap part.

In use, the end-cap is inserted into an end part of the pressure vessel such that an outer edge of the polymer end-cap part is placed in the vicinity of an end part of the polymer liner and that the end-cap part seals the end part of the pressure vessel.

The application provides a further end-cap arrangement for a polymer pressure vessel. The end cap arrangement includes a polymer end-cap that is produced by injection molding or by compression molding.

The polymer end-cap often comprise parts with rotational symmetric for simplified and cost effective tooling. In other words, the polymer end-cap is designed and produced such that its parts have rotational symmetric.

The polymer end-cap can include an integrated pressure regulator housing or other type of housing.

The polymer end-cap can include a thread for attaching to a pressure vessel. In other words, the polymer end-cap can be adapted for attaching to the pressure vessel via a thread and nut mechanism.

The application provides a pressure vessel unit that includes a polymer pressure vessel and one of the above end-cap arrangement for sealing the polymer pressure vessel.

In short, the application provides a sealing structure or an end-cap, which is produced by injection molding or compression molding, such that it establishes a pressure seal for a pressure vessel and has a number of unique features.

The end cap is adapted or optimized for plastics processing, such as injection or compression molding, thereby allowing cost-effective manufacturing in large batches.

In addition, a desired or ideal implementation of the end-cap is rotational symmetric, to allow for simplified and cost-effective tooling. In one variation, the tooling is adapted such that it results in the end-cap being manufactured with a thread in a one-step injection or compression molding process.

Furthermore, the end-cap can include a number of features that may be implemented depending on the specific needs of application of the end cap. Besides cost-effective manufacturing by including these features directly into the injection or compression molding process, they allow a modular approach for design of the pressure vessel. For instance, one side of the pressure vessel can utilize a version of the end-cap with an integrated pressure regulator housing, while the other side has a simple closed end-cap. One benefit of such a modular approach would be to save weight.

In additional to benefit of sleek design and optimization of the end-cap for injection process, the end-cap is also suitable for using short fiber thermoplastics (SFT) or long fiber thermoplastics (LFT). These materials provide superior mechanical performance, especially when its fiber direction is aligned with structural requirements during the injection process.

The end-cap may also be adapted or designed for mechanical loads being attached to it, in addition to the load from pressure vessel operation.

The end-cap may also accommodate a number of components that are attached to threads or features. This may include disposable components for mechanical protection, load attachments for various purposes, valves or pressure regulator related features, or electronics utilizing the cavities in the end-cap.

The application also provides an improved liner-less polymer pressure vessel.

It is believed that a pressure vessel can be improved by the providing the pressure vessel without liner. This then provides two distinct advantages. First, the weight of the pressure vessel in total would be reduced. Second, access ports at any location of the pressure vessel are enabled, because the otherwise necessary gas-tight seal with the liner on the inside is not necessary. A variation of the application describes the beneficial design of such an access port without necessary reinforcements.

The application also provides a method for producing a liner-less polymer pressure vessel.

The method comprising a step of providing at least one initial polymer layer to form an initial pressure vessel, wherein the initial polymer layers are positioned longitudinal respect to the pressure vessel. The initial pressure vessel acts a base or shell for receiving further polymer layers to form a final pressure vessel.

After this, the at least one initial polymer layer is hardened or cured for strengthening the initial polymer layer.

A further polymer layer is then wound around the initial polymer layer for forming a final pressure vessel.

The further polymer layer can be wound at a predetermined inclination with respect to the longitudinal axis of the pressure vessel. In other words, the further polymer layer can be wound at different angles, thus providing different options for forming the desired pressure vessel.

The application provides a further method for forming a liner-less polymer pressure vessel.

The method includes a step of providing a polymer pressure vessel body over a mandrel.

Polymer layers are then wound around the pressure vessel body for forming a main reinforcement, wherein the main reinforcement compresses the pressure vessel body.

A plug-in end-cap is later provided next to the main reinforcement and next to the polymer pressure vessel body. The end-cap is can be formed by another process, such injection molding.

A polymer layer is afterward wound around the main reinforcement, as well as around the plug-in end-cap to form a further reinforcement such that the further reinforcement compresses the main reinforcement and around the plug-in end-cap.

The application provides a further method to produce a liner-less polymer pressure vessel.

The method includes a step of placing at least one initial polymer layer over a mandrel to form an initial pressure vessel, wherein the at least one initial polymer layer is positioned laterally with respect to the initial pressure vessel.

The initial pressure vessel is later cut, in a lateral direction with respect to the initial pressure vessel, for separating the initial pressure vessel into two parts. After this, the mandrel is removed from the pressure vessel parts.

The lateral cutting does not cut across the polymer layer. In other words, the cutting does not advantageously mechanically weaken the pressure vessel.

The pressure vessel parts are subsequently hardening for strengthening the pressure vessel parts. A polymer layer is then wound over the strengthened pressure vessel parts to form a final pressure vessel.

An access port can be placed on sides of the pressure vessel.

Put differently, the application provides different methods of producing a liner-less polymer pressure vessel.

An improved method of producing a liner-less polymer pressure vessel with a pipe-shape is described below. The pressure vessel comprises two end-caps and a middle section. The first method includes a step of laying one or more initial layers of 0 degree fibers with respect to a longitudinal axis of the pressure vessel, wherein these initial layers directly connect the both end-caps. With sufficient material laid down, the initial layer or layers are then cured such that they would be strong enough to allow continuous winding at specified winding angles of further layers for forming a final pressure vessel.

A further improved method of producing a liner-less polymer pressure vessel, which uses a mandrel together with either one end-cap or a dome section, is described below.

The method includes a step of winding a polymer layer around a fixed mandrel for forming an end part of the pressure vessel. When the pressure vessel end part has achieved a predetermined full strength, the polymer layer is cut for separating the pressure vessel end part from the rest of the other polymer layer. The mandrel is then removed from the pressure vessel end part.

Main reinforcement layers are then wound around an external surface of the pressure vessel end part and are cut circumferentially, wherein the main reinforcement layers exert a compressive force on the pressure vessel end part. An end-cap or a dome support structure is then placed next to the pressure vessel end part and placed in the vicinity of the main reinforcement layers.

Further reinforcement layers are then wound around the main reinforcement layers and around the end cap to form a strong connection between the main reinforcement layers and the pressure vessel end part and between the end cap and the pressure vessel end part. The further reinforcement layers also exert a compressive force on the main reinforcement layers, the end cap and the pressure vessel end part.

The above winding can be done at different angles.

Another improved method of producing a liner-less polymer pressure vessel is described below. The pressure vessel has a constant cross section middle section and two end caps. A longitudinal axis of the pressure vessel extends between the two end caps.

The method includes a step of winding an initial layer of polymer fibers around a mandrel at near or about 90 degree with respect to the longitudinal axis of the mandrel to form an initial pressure vessel. The polymer layer is then cut circumferentially somewhere in a constant cross section middle section of the initial pressure vessel to form two parts. The mandrel is later removed from the initial pressure vessel and the two parts later placed next to each other. The pressure vessel parts are afterward cured for strengthening the pressure vessel parts. Further polymer layer then wound around the cured pressure vessel parts to form a final pressure vessel.

This pressure vessel parts allows formation of small access ports at any point of its constant cross section middle section, which is an important aspect of this method. In detail, the access port can be created on an area by locally reinforcing the area with additional reinforcement material. After this, the reinforced area can be drilled while the drilled area has sufficient mechanical strength.

This pressure vessel parts and the access port reinforcement can advantageously include thermoplastic matrix composites. Herein, the location of the access port and the reinforcement material are locally heated beyond the melting point of the thermoplastic matrix composites. After this, a heat pin laterally displaces the reinforcement fibers to form a small hole, which acts an access port. The reinforcement fibers are therefore not weakened but they only squeezed around the small hole, thereby retaining the original strength of the reinforcement fibers.

DESCRIPTION OF THE FIGURES

FIG. 12 illustrates a mandrel and a plug-in end-cap for forming a pressure vessel.

DETAILED DESCRIPTION

In the following description, details are provided to describe embodiments of the application. It shall be apparent to one skilled in the art, however, that the embodiments may be practiced without such details.

Some parts of the embodiment have similar parts. The similar parts may have the same names or similar part numbers with an alphabet symbol. The description of one similar part also applies by reference to another similar part, where appropriate, thereby reducing repetition of text without limiting the disclosure.

Figure 1:
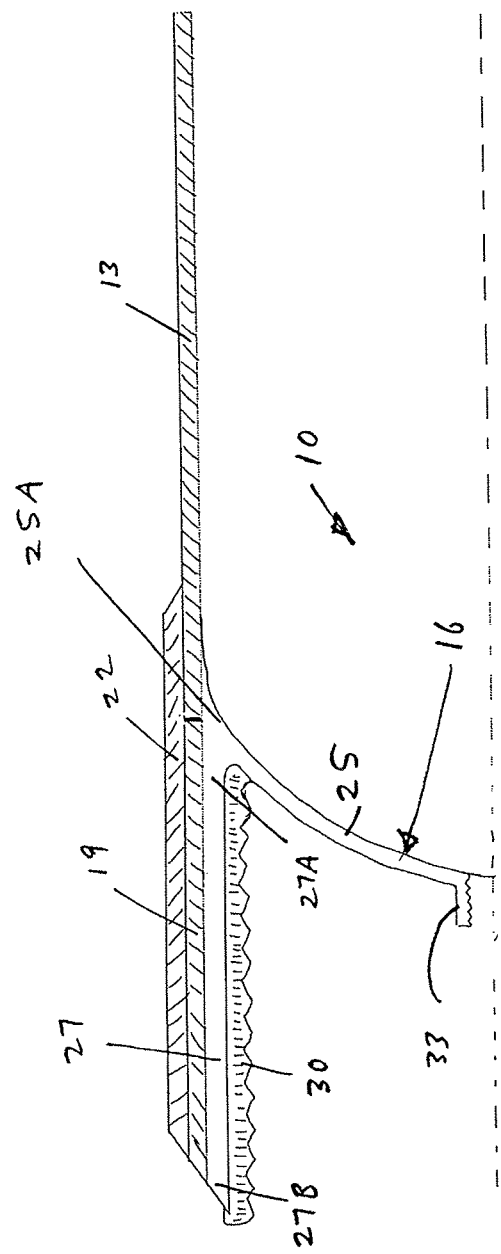
FIG. 1 illustrates a first end-cap arrangement for a pressure vessel.

FIG. 1 shows an end-cap arrangement 10 for a polymer pressure vessel 13.

This pressure vessel 13 refers to a Type V pressure vessel, which relates a polymer pressure vessel that does not include a liner. The pressure vessel 13 is provided in a shape of a cylinder with an essentially circular or essentially elliptical cross section.

Figure 10:
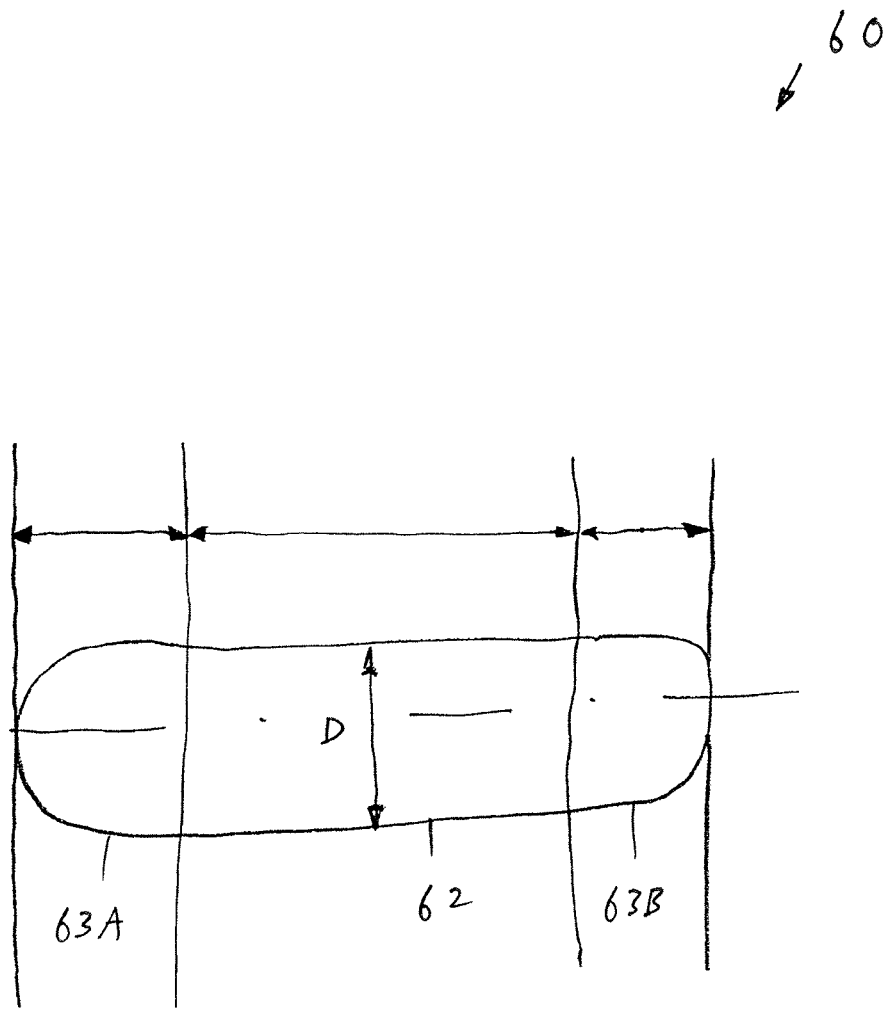
FIG. 10 illustrates a pressure vessel for the end-cap arrangement of FIGS. 1 and 3.

The pressure vessel often includes a pipe shape structure 60 that includes a cylinder 62 with a constant cross-sectional area and two end caps 63A and 63B, as shown in FIG. 10. The end caps 63A and 63B are placed at the two ends of the cylinder 62.

The end-cap arrangement 10 includes an end cap 16, a filler element 19, and a reinforcement ring 22. The end cap 16 is inserted into the pressure vessel 13. The filler element 19 is placed next to one end of the pressure vessel 13. The filler element 19 is also placed between the reinforcement ring 22 and a portion of the end cap 16.

In detail, the end cap 16 includes a dome portion 25 and a cylindrical portion 27. An outer portion 25A of the dome portion 25 is integrally connected to a first end portion 27A of the cylindrical portion 27.

The dome portion 25 is adapted such that its shape, thickness, fiber direction for example LFT, minimizes the amount of material needed to satisfy given structural requirements.

The outer portion 25A of the dome portion 25 includes an edge portion with a tapered cross-section. The edge portion is adapted for inserting into one end of the pressure vessel 13 such that the end cap 16 seals this end of the pressure vessel 13 while the tapered cross-section acts to reduce mechanical stress.

A second end portion 27B of the cylindrical portion 27 can include a chamfer, a rounded edge, or other features, which are adapted to protect the reinforcement ring 22 from impact that is directed around an outer edge of the cylindrical portion 27.

The cylindrical portion 27 and the reinforcement ring 22 are adapted such that they provide a radial compression of the filler element 19.

A layer 30 of injection compliant design with rounded edges is provided on an inner surface of the reinforcement ring 27. The layer 30 has an approximately constant thickness while the design prevents accumulations of material.

The layer 30 can be adapted to provide integrated features to attach components, either temporarily to facilitate pressure vessel manufacturing or for operational use of the pressure vessel 13, such as mechanical attachments, connecting multiple pressure vessels, electronics, special regulators, valves, protective components, etc.

In another embodiment, the layer 30 is replaced by a metal insert. The metal insert can include screw threads.

The dome portion 25 can include a regulator housing 33, which is provided as fully closed or which is provided with a threaded portion.

Figure 2:
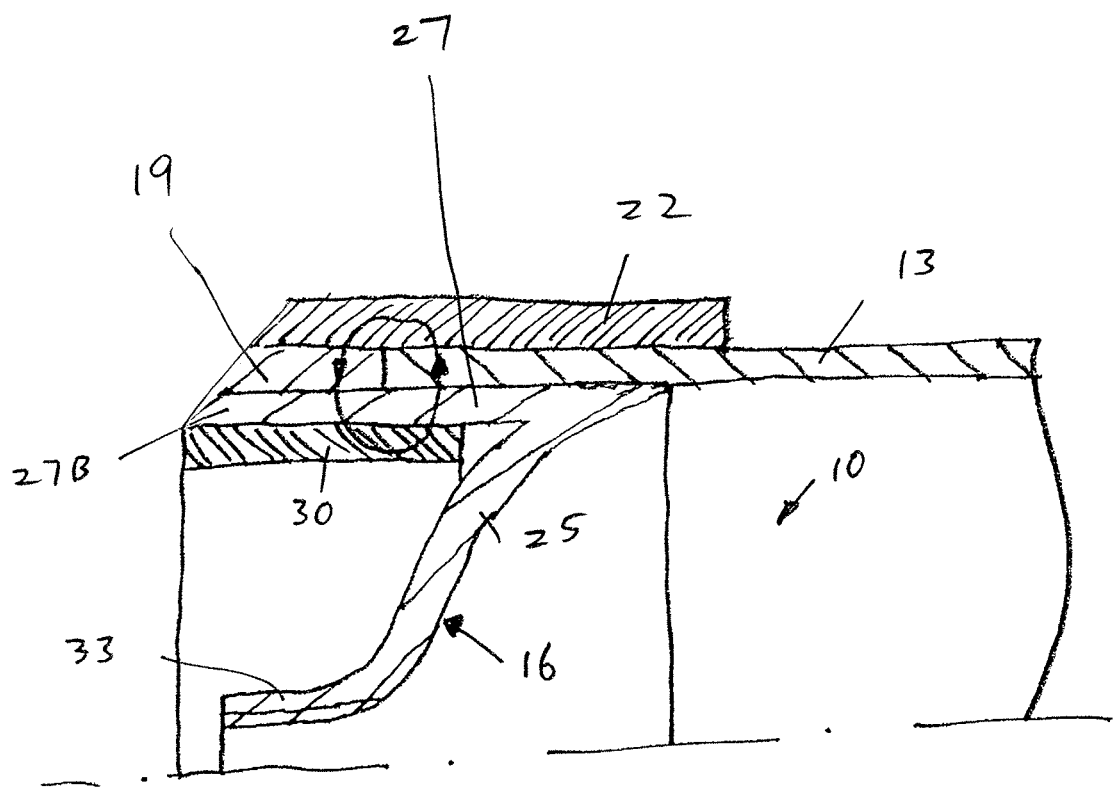
FIG. 2 illustrates a variant of the end-cap arrangement of FIG. 1.

FIG. 2 shows a variant of the end-cap arrangement 10 of FIG. 1. The cylindrical portion 27 and the reinforcement ring 22 are adapted such that they provide a radial compression of the filler element 19 and also a further additional radial compression of the pressure vessel 13.

This advantageously allows for a strong attachment of the dome portion 25 to the pressure vessel 13.

Figure 3:
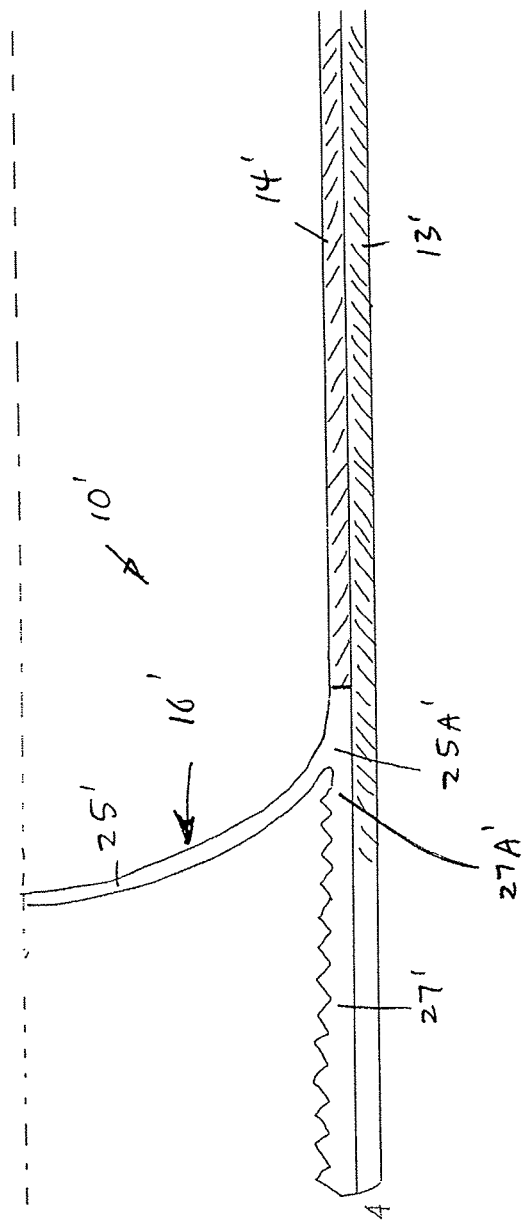
FIG. 3 illustrates a second an end-cap arrangement for a pressure vessel.
Figure 4:
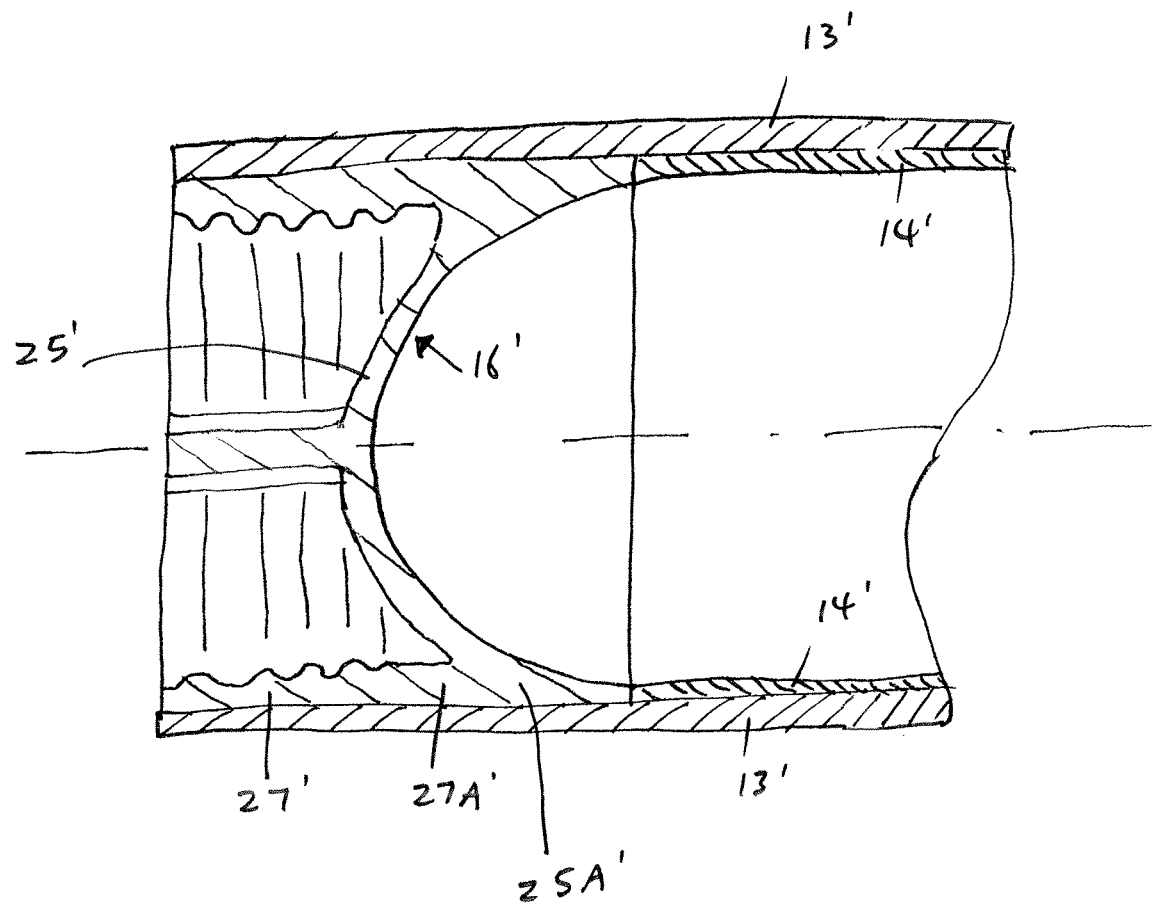
FIG. 4 illustrates a second sectional view of the end-cap arrangement of FIG. 3.

FIGS. 3 and 4 show an end-cap arrangement 10', which a variant of the end-cap arrangement 10, for a polymer pressure vessel 13'.

This pressure vessel 13' refers to a Type VI pressure vessel, which relates a polymer pressure vessel that includes a polymer liner 14'.

The polymer liner 14' is placed inside the pressure vessel 13' and is placed next to an inner surface of the pressure vessel 13' to provide a butt joint or any other method of gas-tight seal.

The end-cap arrangement 10' includes an end cap 16'. The end cap 16' is inserted into the pressure vessel 13'.

In detail, the end cap 16' includes a dome portion 25' and a cylindrical portion 27'. An outer portion 25A' of the dome portion 25' is integrally connected to a first end portion 27A' of the cylindrical portion 27'.

The outer portion 25A' of the dome portion 25' is placed next to an end part of the liner 14' and is bonded to said end part while the cylindrical portion 27' is placed next to the end part of the pressure vessel 13'.

Figure 5:
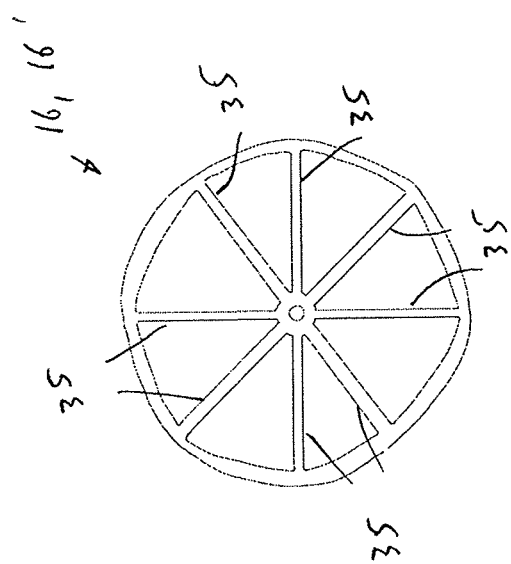
FIG. 5 illustrates a first reinforcement fillet of an end-cap of the end-cap arrangement of FIGS. 1 and 3.

FIG. 5 shows a plurality of first reinforcement fillets 35 for the end-cap of the end-cap 16 or 16' of FIGS. 1 and 3. The reinforcement fillets 35 are utilized to reinforce the respective dome portion 25 or 25'. The fillets 35 may include reinforcements for threads for attachments or other mechanical features.

Figure 6:
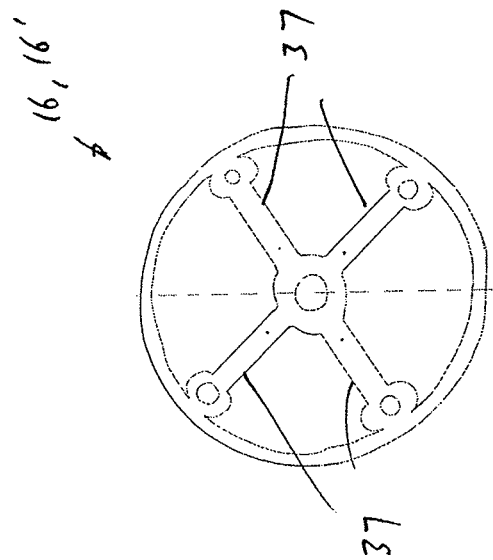
FIG. 6 illustrates a second reinforcement for the end-cap of the end-cap arrangement of FIGS. 1 and 3.

FIG. 6 shows a plurality of second reinforcement fillets 37 for the end-cap of the end-cap 16 or 16' of FIGS. 1 and 3.

Figure 7:
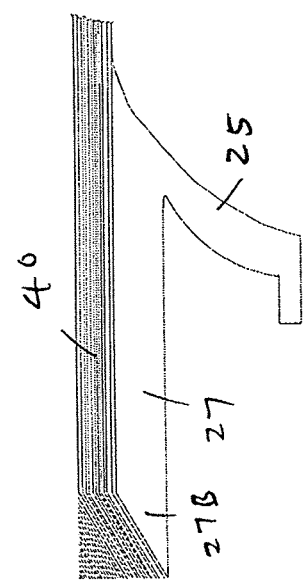
FIG. 7 illustrates a first end part reinforcement with a hoop winding for an end part of a cylindrical portion of an end cap of the end-cap arrangement of FIGS. 1 and 3, the end part includes a chamfered edge.

FIG. 7 shows a first end part reinforcement 40 with a hoop winding for the end part 27B of the cylindrical portion 27 of the end cap 16. The end part 27B includes a chamfered edge. The hoop winding acts to reduce shear stresses on the end-cap 16.

Figure 8:
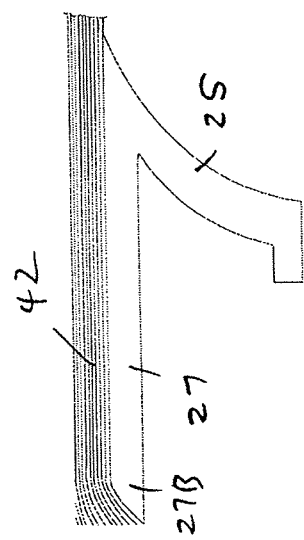
FIG. 8 illustrates a second end part reinforcement with a hoop winding for the cylindrical portion of the end cap of the end-cap arrangement of FIGS. 1 and 3, the end part includes a rounded edge.

FIG. 8 shows a first end part reinforcement 42 with a hoop winding for the end part 27B of the cylindrical portion 27 of the end cap 16. The end part 27B includes a rounded edge. The hoop winding acts to reduce shear stresses on the end-cap 16.

Figure 9:
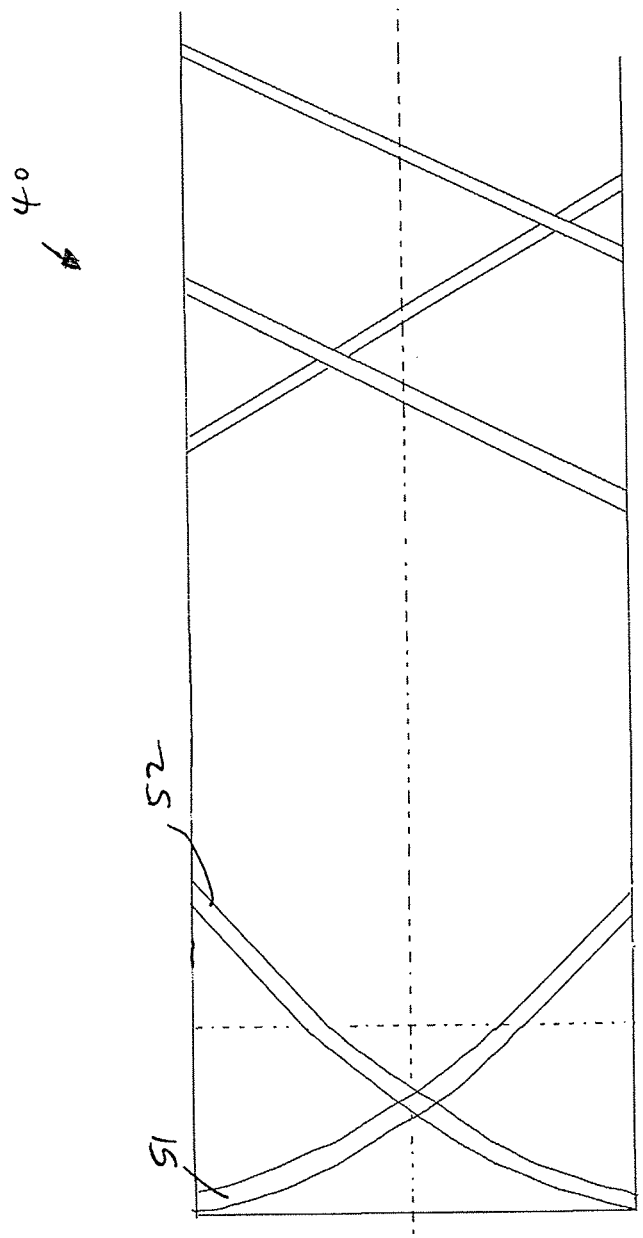
FIG. 9 illustrates a continuous winding pattern of the hoop winding of FIGS. 7 and 8.

FIG. 9 shows a continuous winding pattern of the hoop winding of FIGS. 7 and 8. The winding pattern, which consists of a constant angle section 52 and a continuously increasing or decreasing angle section 51. The purpose of increasing the angle up to 90 degrees (hoop windings) and then lowering it back to the constant angle is to allow gradually increasing material accumulation at the edge in order to compensate for it round or chamfered profile and also allows a winding scheme without the need to cut and re-start. In other words, this winding pattern allows an outer surface of the part reinforcement 40 or 42 to have an essentially constant circumference.

In other words, the embodiments provide a method for manufacturing an improved pressure vessel with low cost. The pressure vessel can have a pipe shaped structure and be produced with continuous fiber reinforcement.

The end-cap is manufactured and it is then included into a pressure vessel manufacturing, either by directly welding the reinforcement structure onto the end-cap or by establishing some other form of adhesive or cohesive bond.

In comparison to other techniques, such as winding of dome structures, this process is easier and faster.

The embodiments can also be described with the following lists of features or elements being organized into an item list. The respective combinations of features, which are disclosed in the item list, are regarded as independent subject matter, respectively, that can also be combined with other features of the application.

1. Injection or compression molded components for cost-effective volume manufacturing.
2. Designed for combination with fiber reinforced polymer reinforcement.
3. Rotational symmetric (except for inserts and thread) for simplified/cost-effective tooling.
4. Optimized shape for improved injection or compression molding process.
5. Structurally optimized geometry, such as dome shape/thickness, bond area with reinforcement, reinforcement fillets.
6. Structure is designed to optimize injection/compression process for structurally ideal distribution of fibers.
7. Can be used for Type-IV pressure vessels, which refer to polymer pressure vessels with corresponding polymer liners and be used for Type-V pressure vessels, which refer to polymer pressure vessels without a liner.
8. Features to protect mechanically the pressure vessel reinforcement at the edges.
9. Modularity of concept with different types of end-caps that can be combined as needed.
10. Integrated features on the outside (for example thread, snap-on) to attach subcomponents.
11. Outside features to be designed for simplified tooling.
12. Outside feature thread, optimized for mechanical strength without post processing.
13. Modularity of subcomponents attached to outside feature.

Figure 11:
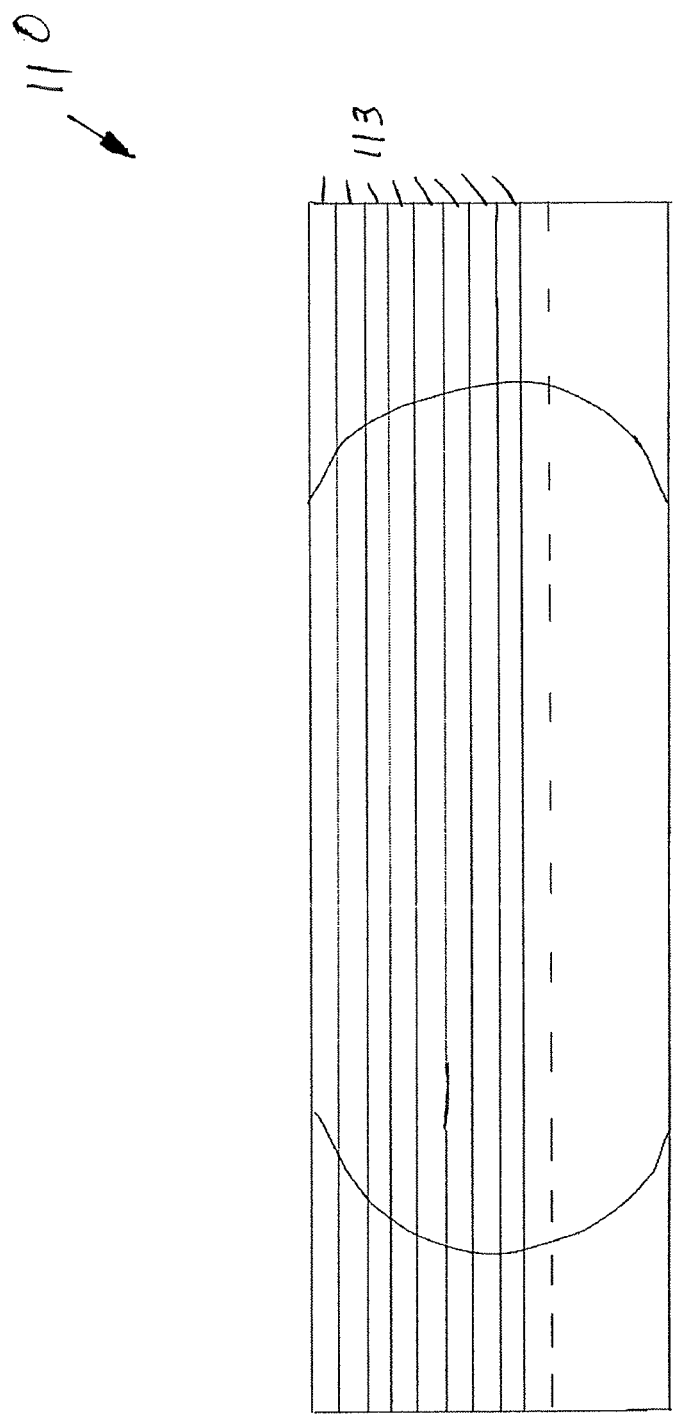
FIG. 11 illustrates a pressure vessel with one or more polymer layers, which are positioned at about 0 degree with respect to longitudinal axis of the pressure vessel.

FIG. 11 shows a method of producing a pressure vessel 100 that includes a constant cross section middle section and two end caps.

The method includes a step placing one or more initial polymer layers 113 to form an initial pressure vessel 100. The initial polymer layers are positioned at about 0 degree with respect to longitudinal axis of the pressure vessel 100.

The initial polymer layers 113 are then cured such that they are strong enough to carry a winding for forming the final pressure vessel 100. In other words, more polymer layers can be wound around the initial polymer layers 113 to form the final pressure vessel 100. The later polymer layers have other inclinations.

FIG. 12 shows a further method for forming a pressure vessel.

A method for forming a pressure vessel 121 includes a step of providing a polymer pressure vessel body over a mandrel 120.

Layers of polymer are then wound around the polymer pressure vessel body for forming a main reinforcement 123 such that the main reinforcement 123 compresses the polymer pressure vessel body.

After this, a plug-in end-cap or a dome support structure 125 is placed next to the main reinforcement 123 and next to the polymer pressure vessel body. The dome support structure 125 includes features, such as a recess, that correspond to features of main reinforcement 123 and of the polymer pressure vessel body such the dome support structure 125 fits with the main reinforcement 123 and with the pressure vessel body. The end cap 125 and the main reinforcement 123 also forms a flush external surface.

A layer of polymer is then wound around the main reinforcement 123 and around the dome support structure 125, wherein the polymer layer form a further reinforcement 130 and wherein the further reinforcement 130 compresses the main reinforcement 123, the dome support structure 125, and the pressure vessel body.

The further reinforcement 130 advantageously acts to keep the main reinforcement 123 and the dome support structure 125 fixed or attached to the pressure vessel body.

Figure 14:
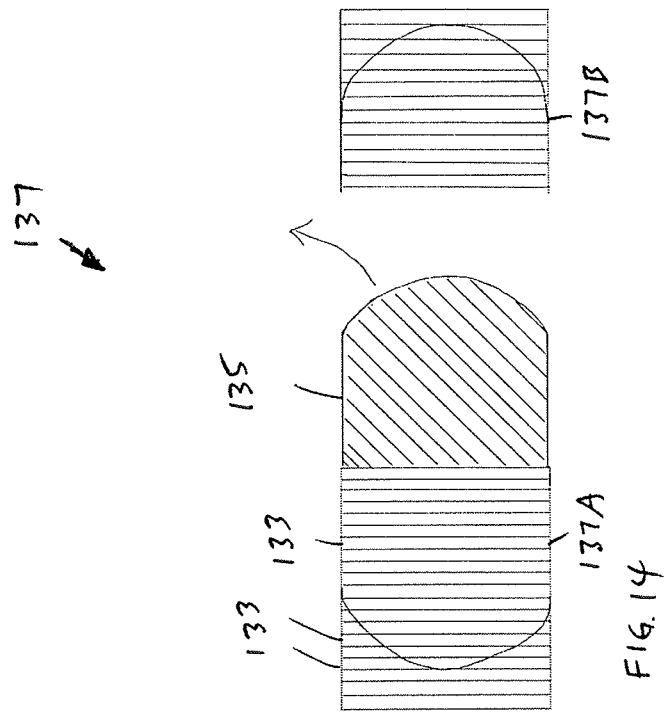
FIG. 14 illustrates a removing of a mandrel from the pressure vessel of FIG. 13.
Figure 13:
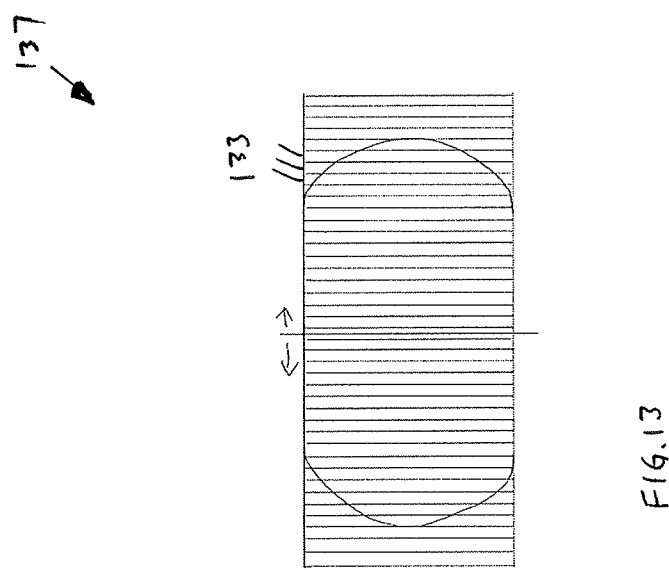
FIG. 13 illustrates a pressure vessel with one or more polymer layers, which are positioned at about 90 degree with respect to longitudinal axis of the pressure vessel.

FIGS. 13 and 14 show another method of forming a further pressure vessel.

The method includes a step of placing one or more initial polymer layers 133 over a mandrel 135 to form an initial pressure vessel 137. The initial polymer layers are placed at essentially 90 degree with respect to a longitudinal axis of the initial pressure vessel 137, as shown in FIG. 13.

After this, the initial pressure vessel 137 is cut in a direction that is essentially 90 degree with respect to a longitudinal axis of the initial pressure vessel 137 for separating the initial pressure vessel 137 into two parts 137A and 137B. After this, the mandrel 135 is removed from the pressure vessel parts 137A and 137B, as shown in FIG. 14.

The two pressure vessel parts 137A and 137B later placed next to each other such that the cut portions positioned adjacent to each other. The pressure vessel parts 137A and 137B are afterward cured for strengthening the pressure vessel parts 137A and 137B for holding further polymer layer winding. Further polymer layer then wound around the cured pressure vessel parts 137A and 137B to form a final pressure vessel.

Figure 15:
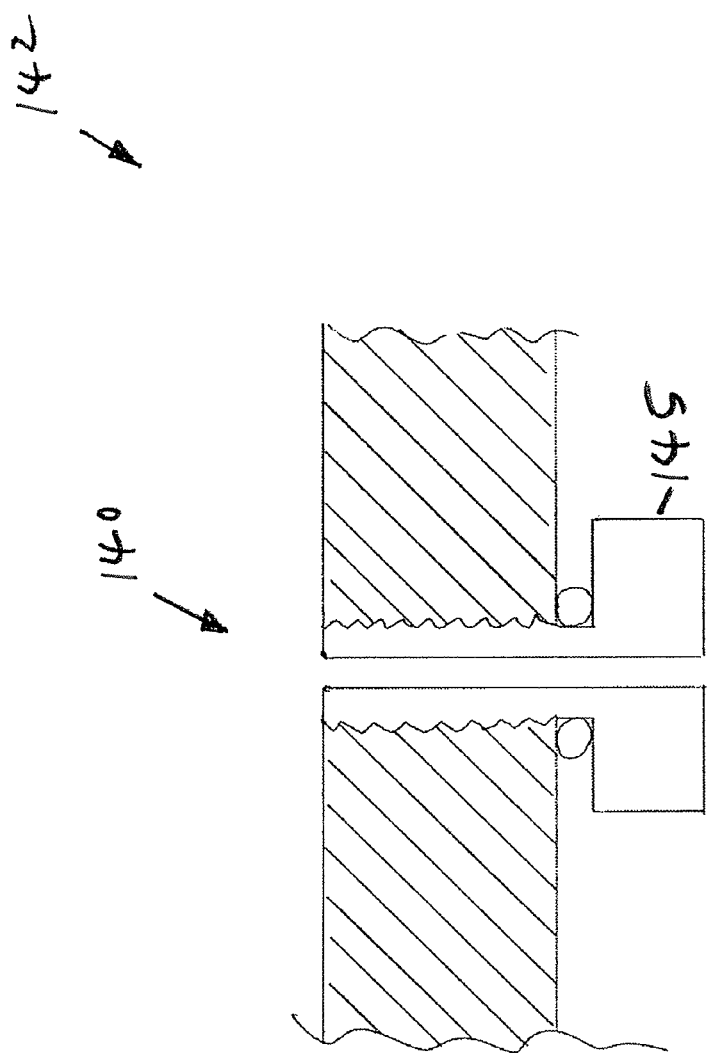
FIG. 15 illustrates an access port cross section of a pressure vessel.

FIG. 15 shows a cross section of an access port 140 of a pressure vessel 142. The access port 140 includes a simple mechanical threaded, form-locking, or adhesive fixture of insert 145. The insert 145 includes a gas-tight seal, which can be provided by a sealing ring or by fusion or bonding between the insert and reinforcement material.

Figure 16:
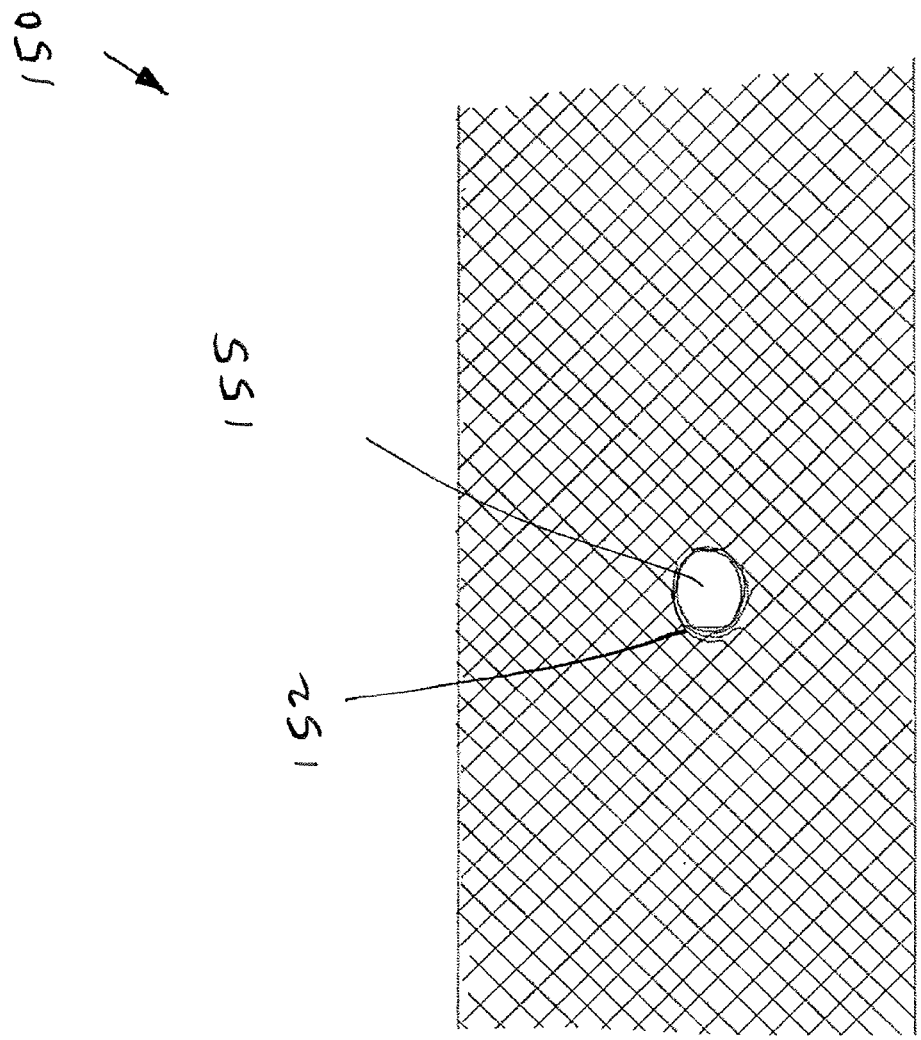
FIG. 16 illustrates a fiber displacement for the access port reinforcement.

FIG. 16 shows a pressure vessel 150 with fiber displacement 152 for an access port reinforcement. Fibers are laterally displaced around a hole of the access port 155, which leads to accumulation of reinforcement fibers around the hole.

The embodiments can also be described with the following lists of features or elements being organized into an item list. The respective combinations of features, which are disclosed in the item list, are regarded as independent subject matter, respectively, that can also be combined with other features of the application.

Item List

1. Pressure vessel design, such that it allows the placement of one or more layers of reinforcement material along the main axis (0 degree fibers), connecting both end parts.
2. Implementation of item 1, such that these base layers create a structure, sufficient to lay additional reinforcement material in desired winding angles.
3. Pressure vessel design, such that it allows the removal of a mandrel after the first winding step.
4. Pressure vessel design with an end-piece fitting into the intermediate structure built and allowing subsequent placement of reinforcement material.
5. Pressure vessel design with base layer or layers that allow cutting and subsequent removal of core material.
6. Pressure vessel design, such that it allows small access ports in the sides of pressure vessels
7. Pressure vessel design, such that access ports are created with displaced fiber architecture with thermoplastic polymer matrix.

Item List

1. An end-cap arrangement for a polymer pressure vessel, the end cap arrangement comprising
   an end-cap that comprises
      a polymer end-cap part,
      a polymer inner ring part being integrally connected to the polymer end cap part, wherein the end-cap is provided for inserting into an end part of the pressure vessel such that the polymer end-cap part seals the end part of the pressure vessel,
   a filler element for being provided in the vicinity of the end part of the pressure vessel, and
   a polymer outer ring,
   wherein the polymer inner ring part and the polymer outer ring are arranged for providing radial compression of the filler element.
2. The end-cap arrangement according to item 1, wherein the polymer inner ring part, the polymer outer ring, and the filler element are further arranged for providing radial compression of the filler element and radial compression of the end part of the pressure vessel.
3. The end-cap arrangement according to one of the above-mentioned items, wherein
   the end part, the inner ring part, the outer ring, and the filler element are produced by injection or compression molding process.
4. The end-cap arrangement according to one of the above-mentioned items, wherein
   the filler element is provided in a shape of a cylinder.
5. The end-cap arrangement according to one of the above-mentioned items, wherein
   the polymer end cap is attached to the polymer pressure vessel via a screw and nut mechanism.
6. The end-cap arrangement according to one of the above-mentioned items, wherein
   the polymer end-cap comprises at least one reinforcement fillet.
7. An end-cap arrangement for a polymer pressure vessel with a polymer liner, the end cap arrangement comprising
   an end-cap that comprises
      a polymer end-cap part and
      a polymer inner ring part being integrally connected to the polymer end cap part.

wherein the end-cap is provided for inserting into an end part of the pressure vessel such that an outer edge of the polymer end-cap part is provided in the vicinity of an end part of the polymer liner and that the end-cap part seals the end part of the pressure vessel.

8. An end-cap arrangement for a polymer pressure vessel, the end cap arrangement comprising
a polymer end-cap that is produced by injection molding or by compression molding.

9. The end-cap arrangement according to item 8, wherein the end-cap comprises parts with rotational symmetric for simplified tooling.

10. The end-cap arrangement according to item 8 or 9, wherein the end-cap comprises an integrated pressure regulator housing.

11. The end-cap arrangement according to one of items 8 to 10, wherein
the end-cap comprises a thread for attaching to a pressure vessel.

12. A pressure vessel unit comprising
a polymer pressure vessel and
an end-cap arrangement according to one of the above-mentioned items for sealing the polymer pressure vessel.

13. A method for producing a polymer pressure vessel, the method comprising
providing at least one initial polymer layer to form an initial pressure vessel, wherein the initial polymer layers are positioned longitudinal respect to the pressure vessel,
hardening the initial polymer layer for strengthening the initial polymer layer,
winding further polymer layer around the initial polymer layer for forming a final pressure vessel.

14. The method according to item 13, wherein
the further polymer layer is wound at a predetermined inclination with respect to the longitudinal axis of the pressure vessel.

15. A method for forming a polymer pressure vessel, the method comprising
providing a polymer pressure vessel body over a mandrel,
winding polymer layers around the pressure vessel body for forming a main reinforcement, wherein the main reinforcement compresses the pressure vessel body,
providing a plug-in end-cap next to the main reinforcement and next to the polymer pressure vessel body,
winding a polymer layer around the main reinforcement and around the plug-in end-cap to form a further reinforcement, wherein the further reinforcement compresses the main reinforcement and around the plug-in end-cap.

16. A method to produce a polymer pressure vessel, the method comprising
placing at least one initial polymer layer over a mandrel to form an initial pressure vessel, wherein the at least one initial polymer layer is positioned laterally with respect to the initial pressure vessel,
cutting the initial pressure vessel, in a lateral direction with respect to the initial pressure vessel, for separating the initial pressure vessel into two parts,
removing the mandrel from the pressure vessel parts,
hardening the pressure vessel parts for strengthening the pressure vessel parts,
winding a polymer layer over the pressure vessel parts to form a final pressure vessel.

17. The method according to item 15 or 16 further comprising providing an access port on sides of the pressure vessel.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE LIST 10 end-cap arrangement
13 pressure vessel
16 end cap
19 filler element
22 reinforcement ring
25 dome portion
27 cylindrical portion
25A outer portion
27A first end portion
27B second end portion
30 layer
33 regulator housing
35 reinforcement fillet
37 reinforcement fillet
40 end part reinforcement
42 end part reinforcement
51 section
52 section
60 pipe shape structure
62 cylinder
63A end cap
63B end cap
10' end-cap arrangement
13' pressure vessel
14' liner
16' end cap
25' dome portion
27' cylindrical portion
25A' outer portion
27A' first end portion
100 pressure vessel
113 initial polymer layer
120 mandrel
121 pressure vessel
123 main reinforcement
125 end-cap
130 further reinforcement
133 initial polymer layer
135 mandrel
137 initial pressure vessel
137A part
137B part
140 access port
142 pressure vessel
145 insert
150 pressure vessel
152 fiber displacement
155 access port That which is claimed is:
1. An end-cap arrangement system for a polymer pressure vessel, the end-cap arrangement system comprising an end-cap that comprises
- a polymer end-cap part, and
- a polymer inner ring part being integrally connected to the polymer end-cap part, wherein the end-cap is provided for inserting into an end part of the polymer pressure vessel such that the polymer end-cap part seals the end part of the polymer pressure vessel;
- a filler element for being provided in a vicinity of the end part of the polymer pressure vessel; and
- a polymer outer ring, wherein the polymer inner ring part and the polymer outer ring are arranged for providing radial compression of the filler element.

2. The end-cap arrangement system of claim 1, wherein the polymer inner ring part, the polymer outer ring, and the filler element are further arranged for providing radial compression of the filler element and radial compression of the end part of the polymer pressure vessel.

3. The end-cap arrangement system of claim 1, wherein the end part, the polymer inner ring part, the polymer outer ring, and the filler element are produced by injection or compression molding process.

4. The end-cap arrangement system of claim 1, wherein the filler element is provided in a shape of a cylinder.

5. The end-cap arrangement system of claim 1, wherein the polymer end-cap is attached to the polymer pressure vessel via a screw and nut mechanism.

6. The end-cap arrangement system of claim 1, wherein the polymer end-cap comprises at least one reinforcement fillet.

7. The end-cap arrangement system of claim 1, further comprising the polymer pressure vessel.

* * * * *